US006591101B1

United States Patent
Shimbori

(10) Patent No.: US 6,591,101 B1
(45) Date of Patent: Jul. 8, 2003

(54) METHOD OF SUBSCRIBER DATA CONTROL IN A MOBILE COMMUNICATION NETWORK WHERE SUBSCRIBER DATA IS TRANSFERRED FROM A HOME MOBILE SWITCHING CENTER TO A DESTINATION MOBILE SWITCHING CENTER

(75) Inventor: Takateru Shimbori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/342,907

(22) Filed: Jun. 30, 1999

(30) Foreign Application Priority Data

| Jul. 2, 1998 | (JP) | ............................................ 10-187776 |
| Mar. 3, 1999 | (JP) | ............................................ 11-056194 |
| Apr. 28, 1999 | (JP) | ............................................ 11-123171 |

(51) Int. Cl.[7] .............................................. H04Q 7/20
(52) U.S. Cl. ...................... 455/435; 455/432; 455/445
(58) Field of Search ................................ 455/435, 433, 455/432, 445, 422, 415, 412, 456

(56) References Cited

U.S. PATENT DOCUMENTS

| 5,610,974 A | * | 3/1997 | Lantto ......................... 455/433 |
| 5,712,900 A | * | 1/1998 | Maupin et al. ............... 455/435 |
| 5,819,178 A | * | 10/1998 | Cropper ...................... 455/433 |
| 5,862,481 A | * | 1/1999 | Kulkarni et al. ............ 455/432 |
| 5,905,952 A | * | 5/1999 | Joensuu et al. ............. 455/433 |
| 5,915,220 A | * | 6/1999 | Chelliah ...................... 455/435 |
| 5,953,652 A | * | 9/1999 | Amin et al. ................. 455/435 |
| 6,018,657 A | * | 1/2000 | Kennedy, III et al. ....... 455/426 |
| 6,021,327 A | * | 2/2000 | Nguyen et al. .............. 455/433 |
| 6,047,176 A | * | 4/2000 | Sakamoto et al. .......... 455/422 |
| 6,055,433 A | * | 4/2000 | Yuan et al. .................. 455/453 |
| 6,058,311 A | * | 5/2000 | Tsukagoshi ................. 455/432 |
| 6,151,503 A | * | 11/2000 | Chavez ........................ 455/445 |
| 6,157,831 A | * | 12/2000 | Lamb .......................... 455/433 |
| 6,181,939 B1 | * | 1/2001 | Ahvenainen .................. 55/433 |

FOREIGN PATENT DOCUMENTS

| EP | 0 260 763 | 3/1988 |
| WO | WO 97/44945 | 11/1997 |
| WO | WO 98/47305 | 10/1998 |

* cited by examiner

Primary Examiner—Edward F. Urban
Assistant Examiner—Tilahun Gesesse
(74) Attorney, Agent, or Firm—Whitham, Curtis & Christofferson, PC

(57) ABSTRACT

A subscriber data control method in a mobile communication network which reduces the processing load on a mobile switching center and can effectively use the resource of a visitor subscriber data area is provided the subscriber data of the visitor mobile station is not deleted in response to the subscriber data delete request from its home mobile switching center due to a fact that the visitor mobile station has further moved to another service area, and the state of the registered subscriber data of the visitor mobile station is set as the inactive holding state from the active state, and thereafter in the case where the visitor mobile station returns to the subject service area within a predetermined period of time and again performs the location registration, restoration of the subscriber data of the visitor mobile station can be made by only changing the state of the subscriber data from the inactive state to the active state. With respect to the subscriber data being put as the inactive holding state, it is deleted if no location registration is made within a predetermined period of time.

13 Claims, 9 Drawing Sheets

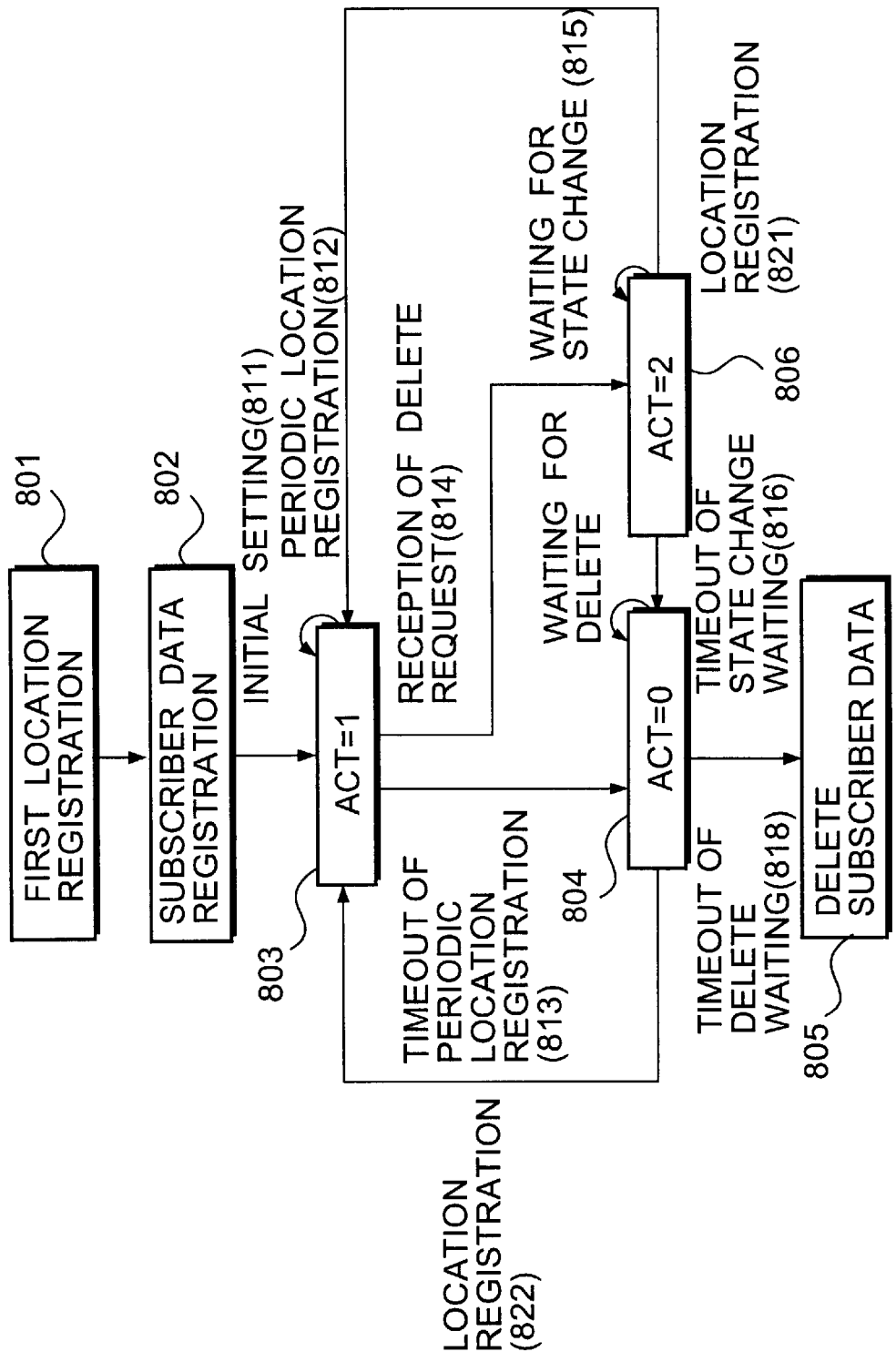

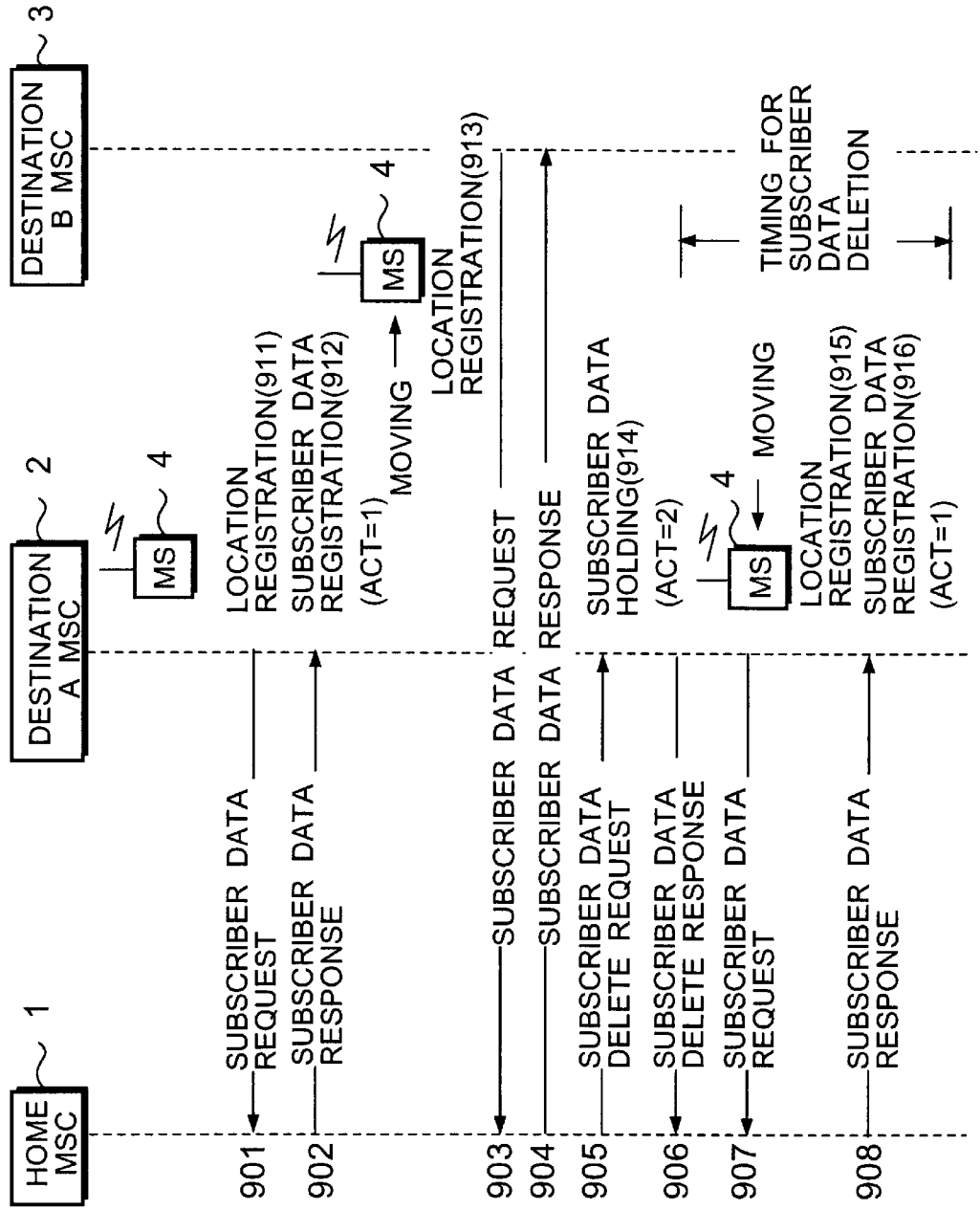

METHOD OF SUBSCRIBER DATA CONTROL IN A MOBILE COMMUNICATION NETWORK WHERE SUBSCRIBER DATA IS TRANSFERRED FROM A HOME MOBILE SWITCHING CENTER TO A DESTINATION MOBILE SWITCHING CENTER

BACKGROUND OF THE INVENTION

1. Field of the Invention

The present invention relates to a subscriber data control method in a mobile communication network, and more particularly to a subscriber data control method in a mobile switching center when a visitor mobile station has entered into a service area controlled by the mobile switching center.

2. Description of the Related Art

The mobile communication network is constituted by a plurality of mobile switching centers as the backbone nodes of a communication network and a plurality of base stations which are controlled by the mobile switching centers and providing radio communication areas (cells). In the actual mobile communication network, a base station control unit that controls the base stations exists between each mobile switching center and each base station, but the technique related to the present invention is not directly involved in the existence of the base station control unit. Accordingly, a description is made assuming that the base station control unit is contained in the mobile switching center.

When a person is newly registered as a mobile communication subscriber (hereinafter referred to as "mobile station") with respect to a mobile communication network provider that managers the above-mentioned mobile communication network, subscriber data relating to the mobile station is registered in a mobile switching center that handles a service area in which the mobile station is normally used. The subscriber data includes various data given to each mobile station individually, and is made up of the representative data, a subscriber number allocated to the mobile station, an equipment number of the mobile station, the contents of service subscribed, registered location information, and so on.

Also, as described above, the mobile switching center is a backbone node of the mobile communication network, and controls a plurality of base stations which provide a plurality of radio communication areas (i.e., cells) as a service area. Therefore, there are a plurality of service areas in the mobile communication network, and each of the service areas are managed and controlled by the respective mobile switching centers. With respect to a particular mobile station, a mobile switching center, in which subscriber data of the mobile station is registered, is called as a home mobile switching center, and a service area controlled by the home mobile switching center is called a home service area. On the other hand, a mobile station, which is located in a particular service area and its subscriber data is not registered in a mobile switching center managing the service area, is called a visitor mobile station to the mobile switching center.

When a mobile station has moved from one service area to another service area, the mobile station is informed that it has moved to a different service area by broadcasting information transmitted in respective service areas. Then, the mobile station performs a location registration operation to notify the mobile communication network that the mobile station has changed the locating service area.

FIG. 1 is a block diagram for explaining a control operation when the mobile station moves around the mobile communication network. The structure of the figure will be described.

Mobile switching centers (MSCs) 1 to 3 constitute a service area H, a service area A and a service area B by base stations (BSs) 11 to 1n, 21 to 2n and 31 to 3n, respectively. A mobile station (MS) 4, its subscriber data has been registered in the MSC 1, is moving through respective service areas. As described above, the MSC 1 is called "home switching center" to the MS4 because the subscriber data of the MS 4 is registered in the MSC 1, and also the service area H is called "home service area". On the contrary, since the MSCs 2 and 3 are mobile switching centers to which the MS4 is going to visit, respectively, they are called "destination A MSC" and "destination B MSC" to MS4.

In the mobile communication network thus structured, the control operation in the case where the MS4 has moved from the service area H to the service are a A will be described.

Upon entering the service area A, the MS4 receives a location registration area number announced by the base stations constituting the service area A and discriminates that the location registration area number is not identical with that stored in the self mobile station. As a result, the MS4 knows that it has moved to a new location registration area (=a service area), and renews the location registration area stored in the self mobile station for a new location registration area number, and notifies the mobile communication network that it has moved to a different service area by transmitting a location registration signal.

The MSC 2 of the service area A, which has received a notification of the location registration by the location registration signal transmitted from the MS 4 through one of base stations in the service area A, performs the location registration request operation for the MS 4. The MSC 2 requests the MSC 1, which is the home MSC of the MS 4 and discriminated by a equipment number transmitted with the location registration signal, to register a new location of the MS 4 (i.e. service area A), and also request the MSC 1 to transfer the subscriber data relating to the MS 4. Then, the MSC 1 renews the location registration information of the MS 4 registered in the subscriber data, and transfers the subscriber data relating to the MS 4 to the MSC 2. The MSC 2 registers the subscriber data of the MS 4 transferred from the MSC 1 as visitor subscriber data in a subscriber data storage area of visitor subscribers.

A call to be terminated to the MS 4, which is visiting to other service area, is first routed by the MSC 1 which is a home MSC of the MS 4, and it is discriminated that the MS 4 exists in the service area A by referring to the location registration information stored in the MSC 1. Then, the call is routed to the MSC 2. The MSC 2 refers to the subscriber data stored in the subscriber data storage area of visitor subscribers, and instructs base stations in the service area A to transmit a paging signal for the MS 4. As the equipment number of the MS 4 is designated in the paging signal, the MS 4 replies to the paging signal when the equipment number of the MS 4 coincides with the equipment number designated in the paging signal, and then, the call is terminated to the MS 4 which has responded to the paging signal.

Also, in the case of dealing with a call origination of the MS 4 by the MSC 2, the MSC 2 refers to the subscriber data in response to the call request from the MS 4, and performs a call origination control in accordance with the subscriber data of the MS 4.

When the MS 4 further moves, and is entering the service area B, the MS 4 transmits the location registration signal in the same manner as the operation performed at the service area A. As the result, the MSC 3 requests the MSC 1 to register new location of the MS 4 (service area B) and to transfer the subscriber data of the MS 4. The MSC 1 responds to the request, and transmits the subscriber data of the MS 4 to the MSC 3. When the MSC 1 knows that the service area in which the MS 4 exists has been changed, the MSC 1 transmits a subscriber data delete request to the MSC 2 to delete the subscriber data of the MS 4 which is no longer required in the service area A. The MSC 2, which has received the subscriber data delete request, deletes the subscriber data of the MS 4 stored as the visitor subscriber data, and sends a delete response back to the MSC 1.

As described above, in the mobile communication system, with the movement of the mobile station, the subscriber data transfer request and the subscriber data delete request are frequently transferred between mobile switching centers, and also the subscriber data registration operation and the subscriber data delete operation are similarly frequently performed in each mobile switching center.

Subsequently, referring to FIG. 2, the tendency of the service area structure in the mobile communication network will be described.

The service area structure in a large city area tends to form concentric circulars by each service area as shown in FIG. 2(A). This aims for expecting such an effect that traffic in each of the service areas is dispersed more as compared with the service area structure forming the wide stretch in the X-Y axial directions as shown in FIG. 2(B).

For example, it is assumed that the down towns exist at positions shown in the figure. Since it is presumed that the mobile station moves along the down town, in case of the service area structure of FIG. 2(B), it tends to occur a condition that the traffic is concentrated in the service area 2 and the service area 4 but there is few traffic in the service area 1 and the service area 3. On the contrary, in case of the service area structure of FIG. 2(A), the occurring traffic is dispersed in the respective service areas 1, 2 and 3. This dispersion of the traffic is desirable because it is effective from the viewpoint of an equipment plan in the mobile communication network.

In the control operation of the mobile communication switching center, an internal processing load relating to the control operation to be performed for the movement of the mobile station is as same amount as or larger than that of the control operation for handling to a call as compared with the switching center of a fixed communication network.

In particular, in the mobile communication network in which the concentric circular service areas are disposed as shown in FIG. 2(A), because the movement of the mobile stations which crosses from one service area to another service areas is severely increased, the registration and the deletion for the visitor subscriber data are frequently carried out, and the number of control signals for the registration request and the deletion request is increased. In addition, in the case where the mobile station existing in the vicinity of the boundary of the service area moves unsteadily, the location registrations are frequently carried out at relatively short time intervals until the mobile station finally enters any one of the service areas.

This results in that an unnecessary load is applied to the mobile switching center because the above-described registration process and the deleting process for the visitor subscriber data are frequently carried out. Especially under the heavy traffic condition, the load of such internal processing affects a call connection processing, which is inherently performed by the mobile switching center, and resulting in such a problem that the call connection processing is suspended in the worst case.

Also, the mobile station belonging to another service area seems to be existing in the visiting service area as far as it has performed the location registration in the visiting service area, and the subscriber data of the mobile station transmitted from the home switching center is always held in the memory area for the visitor mobile station until receiving a deleting request from the home switching center.

In the case where a user of the mobile station in the visiting service area turns off the power of the mobile station and has moved [away] to another service area, or a user of the mobile station in the visiting service area goes to an underground area, where no radio signal is received, and has moved to another place by a subway, the visitor subscriber date of those mobile stations held in the mobile switching center are no longer necessary. The visitor subscriber data of such mobile stations are held until the home switching center receives the location registration request of the mobile station from another mobile switching center and recognizes that the mobile station has moved to another service area, and this results in such a problem that the memory area for the visitor subscriber data is used in, vain.

SUMMARY OF THE INVENTION

The present invention has been made in view of the above-described circumstances, and has an object of the present invention to provide a subscriber data control method in which the load on a mobile switching center does not increase even if the registration and deletion of the visitor subscriber data is frequently carried out, and the subscriber data of a visitor mobile station which does not exist in the service area is deleted so that the resource of the mobile switching center can be effectively used.

In order to solve the above-described problems, according to the present invention, there is provided a subscriber data control method in a mobile communication network in which subscriber data of a mobile station is transferred from a home mobile switching center to a destination mobile switching center when the mobile station moves from a home service area controlled by the home mobile switching center to a destination service area controlled by the destination mobile switching center, and performs a location registration in the destination service area, the method comprises:

(1) registering the subscriber data, in the destination mobile switching center, transmitted from the home mobile switching center in response to a location registration request by the destination mobile switching center in accordance with the location registration performed by the mobile station; and (2) changing a state of the registered subscriber data from an active state representative of an operating state to an inactive state representative of a holding state in response to a subscriber data delete request, which is caused by a recognition of movement of the mobile station to another service area, by the home mobile switching center.

Also, the subscriber data control method according to the present invention is characterized by further comprising:

(1) changing the state of the registered subscriber data from the inactive state to the active state when receiving a location registration from the mobile station within a predetermined period of time after the state of the registered subscriber data was changed to the inactive state; and (2) deleting the registered subscriber data when receiving no further location registration from the mobile station within the predetermined period of time after the state of the registered subscriber data was changed to the inactive state.

Further, the subscriber data control method according to the present invention is characterized by further comprising:
(1) searching the registered subscriber data periodically in a first period of time, and changing the state of the registered subscriber data of the mobile station, which does not perform a periodic location registration for specifying a paging area in the destination service area within a predetermined period of time, to the inactive state; and
(2) searching the registered subscriber data periodically in a second period of time, and deleting the registered subscriber data of the inactive state.

A subscriber data control method according to the present invention is characterized by comprising the following from the viewpoint of the subscriber data state transition:
(1) registering the subscriber data, in the destination mobile switching center, transmitted from the home mobile switching center in response to a location registration request by the destination mobile switching center in accordance with the location registration performed by the mobile station;
(2) searching the registered subscriber data periodically in a first period of time, and changing the state of the registered subscriber data of the mobile station, which does not perform a periodic location registration for specifying a paging area in the destination service area within a predetermined period of time, from an active state representative of an operating state to a first inactive state representative of a delete waiting state;
(3) changing a state of the registered subscriber data from an active state representative of an operating state to a second inactive state representative of a holding state in response to a subscriber data delete request, which is caused by a recognition of movement of the mobile station to another service area, by the home mobile switching center; and
(4) searching the registered subscriber data periodically in a second period of time, deleting the registered subscriber data of the first inactive state, and changing the state of the registered subscriber data of the second inactive state to the first inactive state.

Also, a subscriber data control method according to the present invention is characterized by comprising the following in more detail from the viewpoint of the subscriber data state transition:
(1) registering the subscriber data, in the destination mobile switching center, transmitted from the home mobile switching center in response to a location registration request by the destination mobile switching center in accordance with the location registration performed by the mobile station;
(2) searching the registered subscriber data periodically in a first period of time, and changing the state of the registered subscriber data of the mobile station, which does not perform a periodic location registration for specifying a paging area in the destination service area within a predetermined period of time, from an active state representative of an operating state to a first inactive state representative of a delete waiting state;
(3) changing a state of the registered subscriber data from an active state representative of an operating state to a second inactive state representative of a holding state in response to a subscriber data delete request by the home mobile switching center;
(4) changing the state of the registered subscriber data to the active state when receiving the location registration from the mobile station within a predetermined period of time after the state of the registered subscriber data was changed to any inactive state of the first inactive state and the second inactive state; and
(5) searching the registered subscriber data periodically in a second period of time, deleting the registered subscriber data of the first inactive state, and changing the state of the registered subscriber data of the second inactive state to the first inactive state.

Further, the subscriber data control method according to the present invention is characterized by comprising the following from the viewpoint of reducing the control load of the mobile switching center:
(1) registering the subscriber data, in the destination mobile switching center, transmitted from the home mobile switching center in response to a location registration request by the destination mobile switching center in accordance with the location registration performed by the mobile station;
(2) changing a state of the registered subscriber data from an active state representative of an operating state to an inactive state representative of a holding state in response to a subscriber data delete request by the home mobile switching center; and
(3) ignoring the subscriber data transmitted from the home mobile switching center in response to a location registration request by the destination mobile switching center in accordance with the location registration performed by the mobile station within a predetermined period of time after the state of the registered subscriber data was put in the inactive state, and changing the state of the registered subscriber data from the inactive state to the active state.

Further, the subscriber data control method according to the present invention is characterized by comprising the following from the viewpoint of reducing the control load of the mobile switching center:
(1) registering the subscriber data, in the destination mobile switching center, transmitted from the home mobile switching center in response to a location registration request by the destination mobile switching center in accordance with the location registration performed by the mobile station;
(2) changing a state of the registered subscriber data from an active state representative of an operating state to an inactive state representative of a holding state in response to a subscriber data delete request by the home mobile switching center;
(3) transmitting the location registration request with data indicating that the transfer of the subscriber data is unnecessary to the home mobile switching center when receiving a location registration from the mobile station within a predetermined period of time after the state of the registered subscriber data was put to the inactive state; and
(4) receiving a location registration response from the home mobile switching center, and changing the state of the registered subscriber data from the inactive state to the active state.

The subscriber data control method according to the present invention is characterized by comprising the following from the viewpoint of reducing the transfer signal in the mobile switching network:
(1) registering the subscriber data, in the destination mobile switching center, transmitted from the home mobile switching center in response to a location registration request by the destination mobile switching center in accordance with the location registration performed by the mobile station;

(2) searching the registered subscriber data periodically in a first period of time, and changing the state of the registered subscriber data of the mobile station, which does not perform a periodic location registration for specifying a paging area in the destination service area within a!predetermined period of time, from an active state representative of an operating state to an inactive state representative of a delete waiting state; and (3) searching the registered subscriber data periodically in a second period of time, and deleting the registered subscriber data of the inactive state.

BRIEF DESCRIPTION OF THE DRAWINGS

FIG. 2 is an explanatory diagram showing the tendency of the service area structure in the mobile communication network, in which FIG. 2(A) shows the structure of a concentric circular service area and FIG. 2(B) shows the service area structure having the wide stretch in the X-Y axial directions.

FIG. 5 is a flowchart for explaining the control operation for setting and changing a value of the ACT flag in accordance with the state of the subscriber data through the subscriber data control method according to the present invention, in which

FIG. 8 is a state transition diagram showing the transition of the subscriber data state through the subscriber data control method according to the present invention.

FIG. 9 is a signal sequence diagram showing a case in which the mobile station visited the service area controlled by the destination A MSC and the location registration as a visitor was performed, and the mobile station visited another service area controlled by the destination B MSC, and thereafter the mobile station again returns to the service area of the destination A MSC within a period of the subscriber date delete timing.

DETAILED DESCRIPTION OF PREFERRED EMBODIMENTS

A subscriber data control method according to one embodiment of the present invention will be described with reference to the accompanying drawings.

Figure 1:
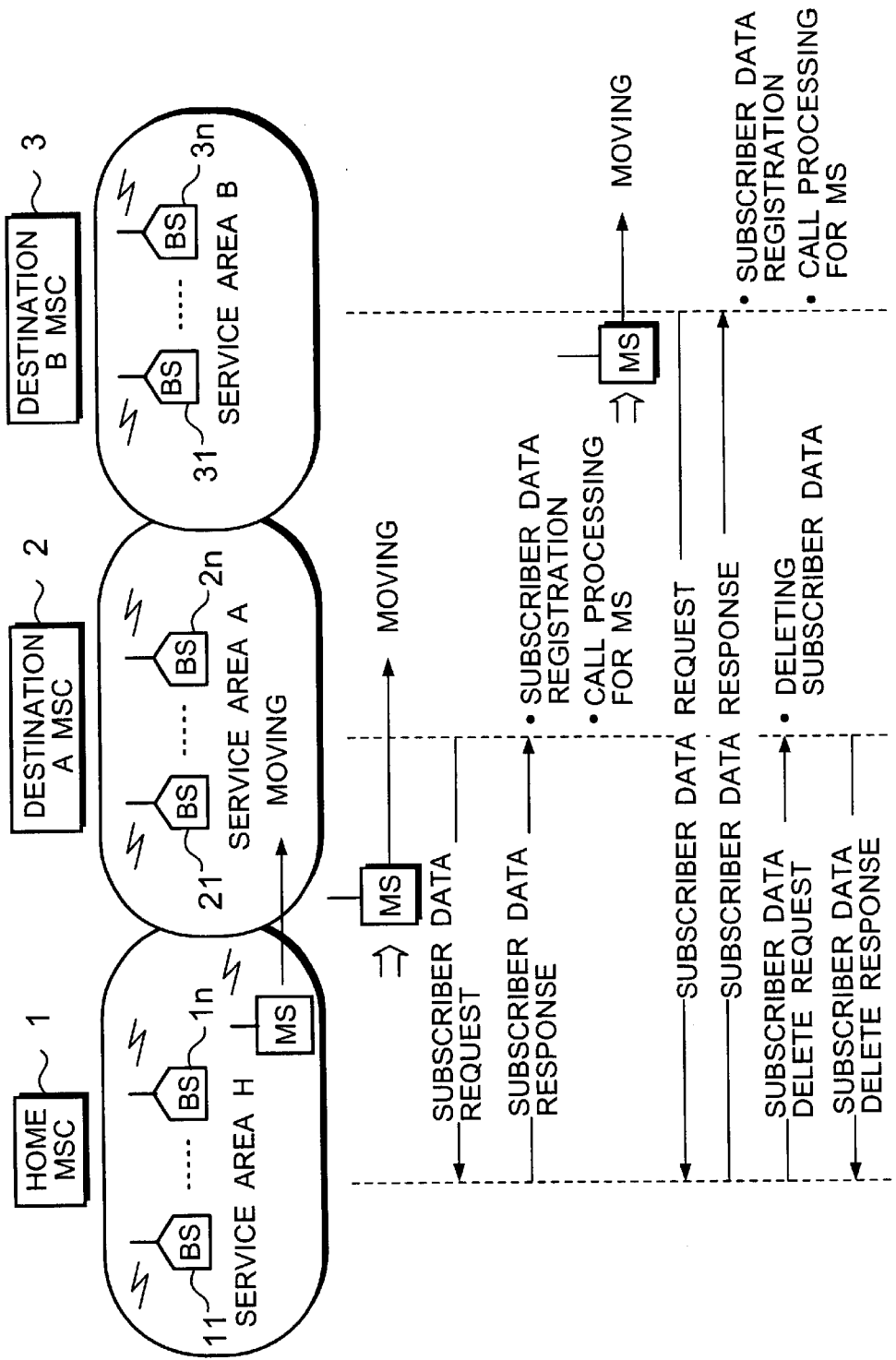
FIG. 1 is a block diagram for explaining a conventional control operation which is performed when the mobile station moves around several service areas in a mobile communication network.
Figure 2:
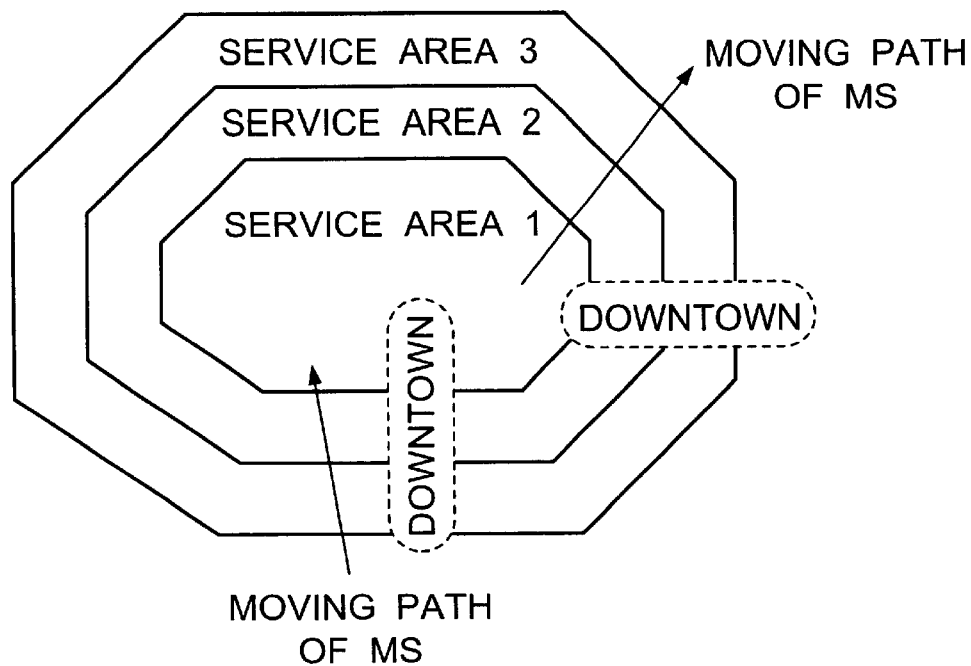
Figure 2:
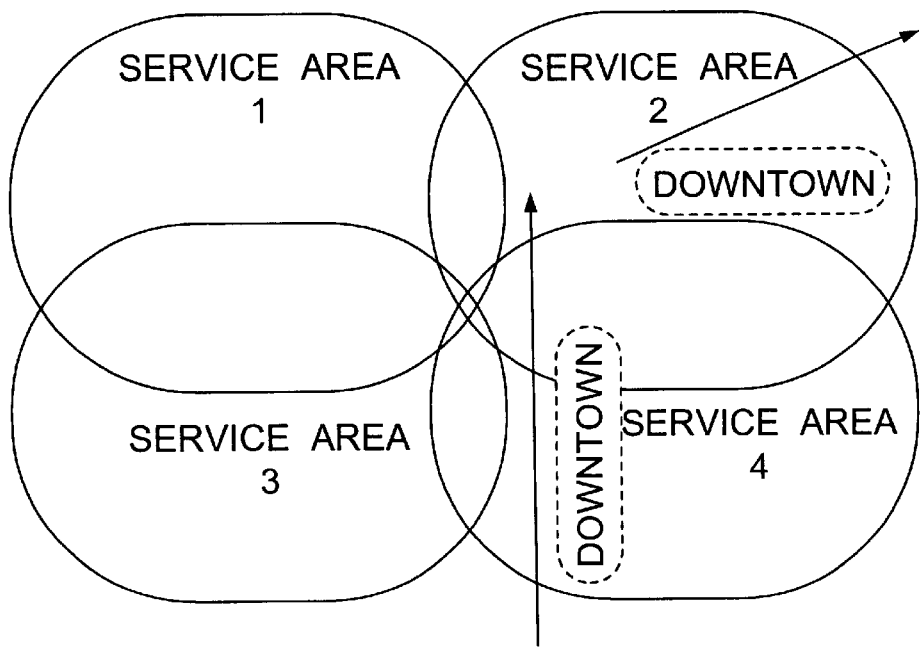
Figure 3:
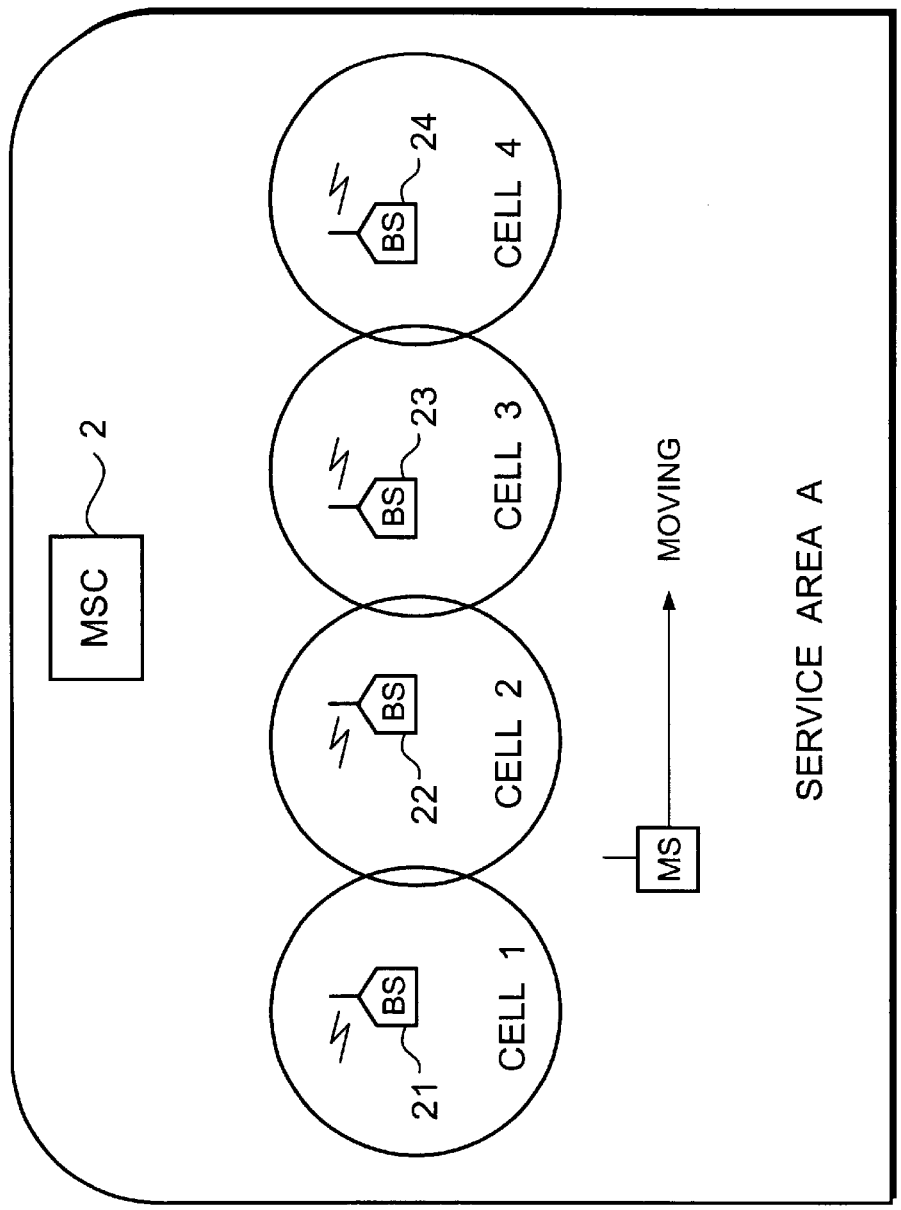
FIG. 3 is a block structural diagram for explaining radio paging areas in a service area.

FIG. 3 is a block structural diagram for explaining radio paging areas in a certain service area.

As described above, in the case of dealing with a terminating call to a certain mobile station, the call is routed to a service area in which the mobile station currently exists, and a paging signal is transmitted simultaneously from base stations in the service area to page the mobile station.

In general, the service area is locally covered by a plurality of base stations (radio cell areas) over a wide area. Therefore, transmitting the paging signal from all the base stations in the service area is a waste of the system resources because the mobile station is located in only one radio cell area.

Therefore, in many mobile communication systems, the service area is further divided into some radio paging areas so that one radio paging area is made up of one or plural radio cell areas, and the mobile station transmits a location registration request signal periodically at several-minute intervals (the time intervals are different according to the system) and notifies the mobile communication switching center that in which paging area the mobile station currently exists.

For example, in FIG. 3, the mobile station performs periodic location registration, and if a base station that receives the periodic location registration and reports it is a BS 22, an MSC 2 recognizes that the mobile station currently exists in the cell of the BS 22. In the case where there is an incoming call to be terminated to the mobile station, the MSC 2 instructs the transmission of a paging signal only to the BS 22.

The above location registration for notification of the radio paging area in which the mobile station exists is only used for controlling the mobile switching center in the subject service area. The mobile switching center, that has received the location registration, performs processing for only renewing location information (paging area information) relating to the subject mobile station managed in the self mobile switching center if it has already received the subscriber data transferred from its home mobile switching center even if the mobile station that performed the location registration is a visitor mobile station.

It is needless to say that if this location registration is a first location registration from the mobile station, the location registration request and the subscriber data transfer request are performed on the home mobile switching center as described above.

This is a supplementary explanation that the mobile switching center is not provided with data sufficient to discriminate which mobile switching center is a home mobile switching center according to an equipment number received from the mobile station together with the location registration signal at the time when the location registration request and the subscriber data transfer request are performed. Accordingly, the above subscriber data request signal is transmitted to database which is commonly provided in the mobile communication network. The common data base can be accessed from any mobile switching centers and is designed so as to manage whole data of the subscriber numbers, the equipment numbers and corresponding home mobile switching centers of all the mobile stations which are subscribed and registered in the mobile communication network. Then, the subscriber data request signal is transferred to the home mobile switching center discriminated through the common database. The subscriber data and the subscriber data response signal sent out from the home mobile switching center are transferred directly to the mobile switching center which is an origination point of the subscriber data request signal transmission. The following description is not applied to the reception and transmission of the signal through the common data base, but an initial subscriber data request signal is thus transferred.

Also, in the case where a user of a mobile station turned off the power supply of the mobile station which as performed the periodic location registration, or in the case where a user of a mobile station goes into an underground to which radio signals do not reach and has moved away anywhere, since the location registration information which was performed at the last time remained as it was, the paging signal is transmitted from the base station corresponding to the radio paging area in response to the incoming call to be terminated to the mobile station. However, in this case, since the mobile station does not exist therein, the mobile station cannot respond to the paging signal, and therefore a processing of no response from the called subscriber is performed.

Subsequently, the subscriber data storing state in the subscriber data control method according to the present invention will be described with reference to FIG. 4.

Figure 4:
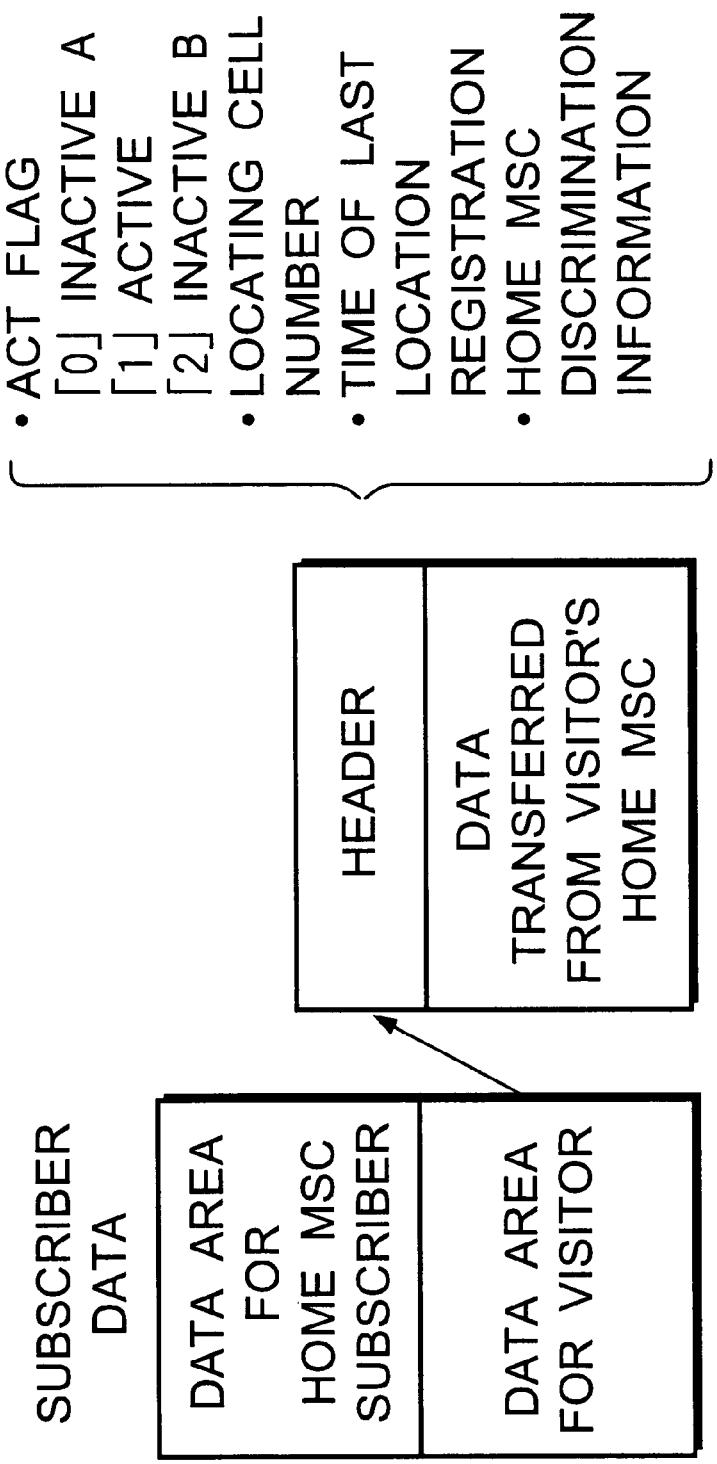
FIG. 4 is a conceptual diagram showing the structure of a subscriber data area of the mobile switching center through the subscriber data control method according to the present invention.

FIG. 4 is a conceptual diagram showing the structure of a subscriber data area of the mobile switching center. The subscriber data area is divided into an area for storing the subscriber data of the mobile stations originally registered and managed in the mobile switching center, and an area for storing the visitors subscriber data transferred from each of their home mobile switching centers.

The visitor subscriber data is made up of a data section for storing the subscriber data transferred from the home mobile switching center in correspondence with each visitor subscriber as it is, and a header section for storing various information representative of the attribute of that data, as shown in FIG. 4. The information in the header section includes an ACT flag indicating whether the subscriber data is effective or not, the latest mobile station existing cell number reported by the periodic location registration (or a mobile station existing radio paging area number), the latest time at which the periodic location registration has been reported and the discrimination information of the home mobile switching center to which the mobile station belongs.

In the ACT flag, the following three data are set in accordance with the state of the subscriber data.

That is, an "active" state data indicative of a state in which the subscriber data is effective and presently used. Specifically, data "1" is set on the active state data. Then, an "inactive" state data indicative of a state in which the subscriber data is ineffective and presently not used. The "inactive" state includes two kinds of data which will be described later, and one of "0" and "2" is set as the inactive state.

The mobile switching center judges the use of the subscriber data from the set data of the ACT flag before referring to the subscriber data. If the ACT flag is "active", the paging control, the call termination control or the call origination control is performed according to the subscriber data set in the data section and the mobile station existing cell number. On the other hand, if the ACT flag is "inactive", the control with respect to the subscriber is performed assuming that no subscriber exists.

Figure 5A:
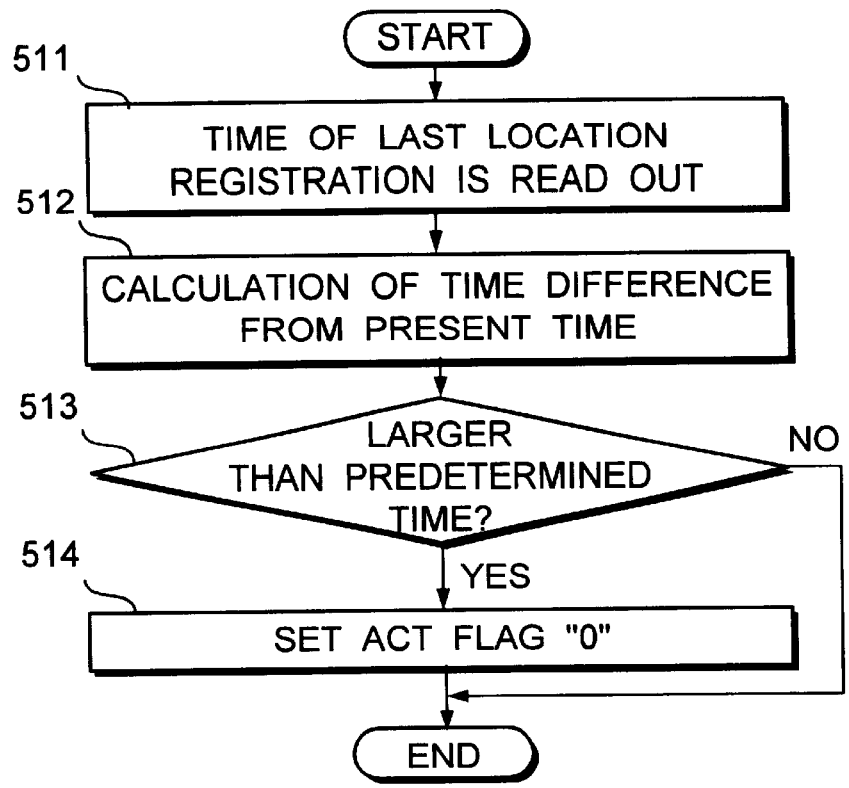
FIG. 5(A) shows the operation of setting and changing the ACT flag of the subscriber data by judging the state of the periodic location registration which is carried out by the mobile station.
Figure 5B:
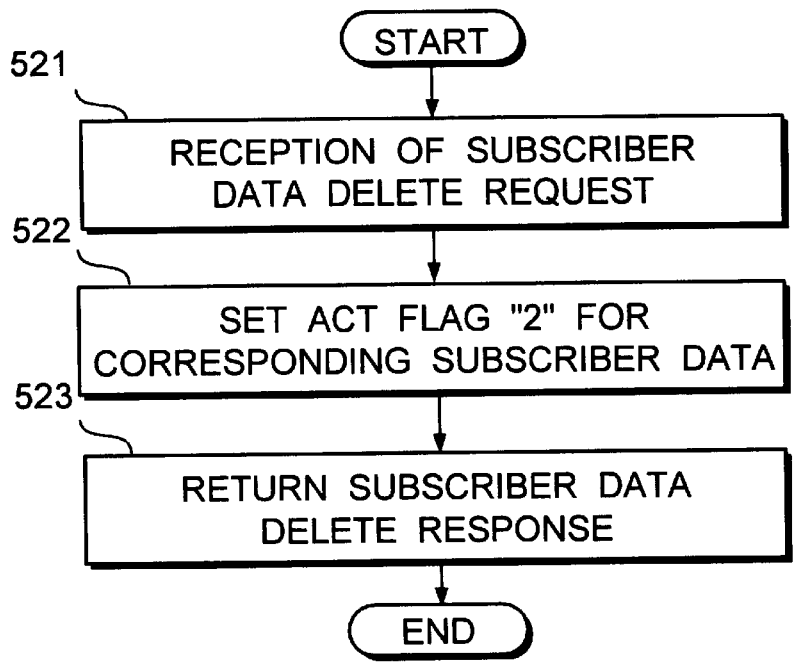
FIG. 5(B) shows the operation of setting and changing the ACT flag when receiving a subscriber data delete request of the mobile station from the home mobile switching center.

As described above, the subscriber data control method according to the present invention will be further described with reference to other drawings, on the basis of the periodic location registration and the structure of the subscriber data. FIG. 5 is a flowchart for explaining the control operation for setting and changing a value of the ACT flag in accordance with the state of the mobile station. FIG. 5(A) shows the operation of setting and changing the ACT flag of the subscriber data by judging the state of the periodic location registration which is performed by the mobile station, and FIG. 5(B) shows the operation of setting and changing the ACT flag when receiving a subscriber data delete request of the mobile station from the home mobile switching center.

The operation of FIG. 5(A) will be first described.

As described above, all the mobile stations existing in the service area perform location registration periodically for notification of the radio paging area. The results of the location registration are successively renewed and recorded as "mobile station existing cell No." and "periodic location registration time" in the header section of the subscriber data which was described with reference to FIG. 4. The operation of monitoring such a periodic location registration is the operation shown in FIG. 5(A), and this control operation is performed by sequentially scanning all the visitor subscriber data periodically at predetermined time intervals (the time intervals about twice the periodic location registration time intervals depending on the applied system).

First, the latest periodic location registration time which is recorded in the header section of the subscriber data is read (step 511), and a time difference between the registration time and the present time is obtained (step 512). If the time difference is larger than a predetermined time difference (step 513: Yes), that is, if the time difference largely exceeds the predetermined time, the ACT flag of the subscriber data with respect to the mobile station which does not perform the periodic location registration is set to "0" and set as the "inactive" state (step 514). This is a concept that a situation in which the mobile station moves in a building shadow or the like, and the mobile station performs the periodic location registration but the base station cannot receive its report several times is saved, but it is assumed that the mobile station from which the base station does not receive the periodic location registration more than several times turns off its power supply or enters an underground to which radio signals do not reach and has moved away anywhere, resulting in setting as the "inactive" state.

On the other hand, the control operation shown in. FIG. 5(B) is a pre-processing operation of the control operation that takes into consideration that the mobile station exists in the boundary of two service areas and goes or comes between both the service areas in a short period of time.

The mobile station, which existed in a certain service area, has moved into, another adjacent service are, and the mobile station performs a new location registration in the new service are, as a result of which the home mobile switching center of the mobile station recognizes that the mobile station has moved from one service area to another service are. The home mobile switching center sends out a request signal for deleting the subscriber data of the mobile station which becomes unnecessary to the mobile switching center of the service area in which the mobile station previously existed. The mobile switching center that has received the subscriber data delete request (step 521) sets the ACT flag of the header section in the registered subscribed data at "2" and puts in the "inactive" state without deleting the subscriber data (step 522). Then, the mobile switching center sends back a subscriber data delete response signal to the home mobile switching center (step 523).

This is the control operation for omitting the operation of obtaining the subscriber data from the home mobile switching center and setting it in the data area in the case where the mobile station returns to the previous service area again within a predetermined period of time even if the mobile station has moved to another service area.

Subsequently, the operation in the case where the location registration is received from the mobile station whose subscriber data is being set as "inactive" will be described with reference to FIG. 6.

Figure 6:
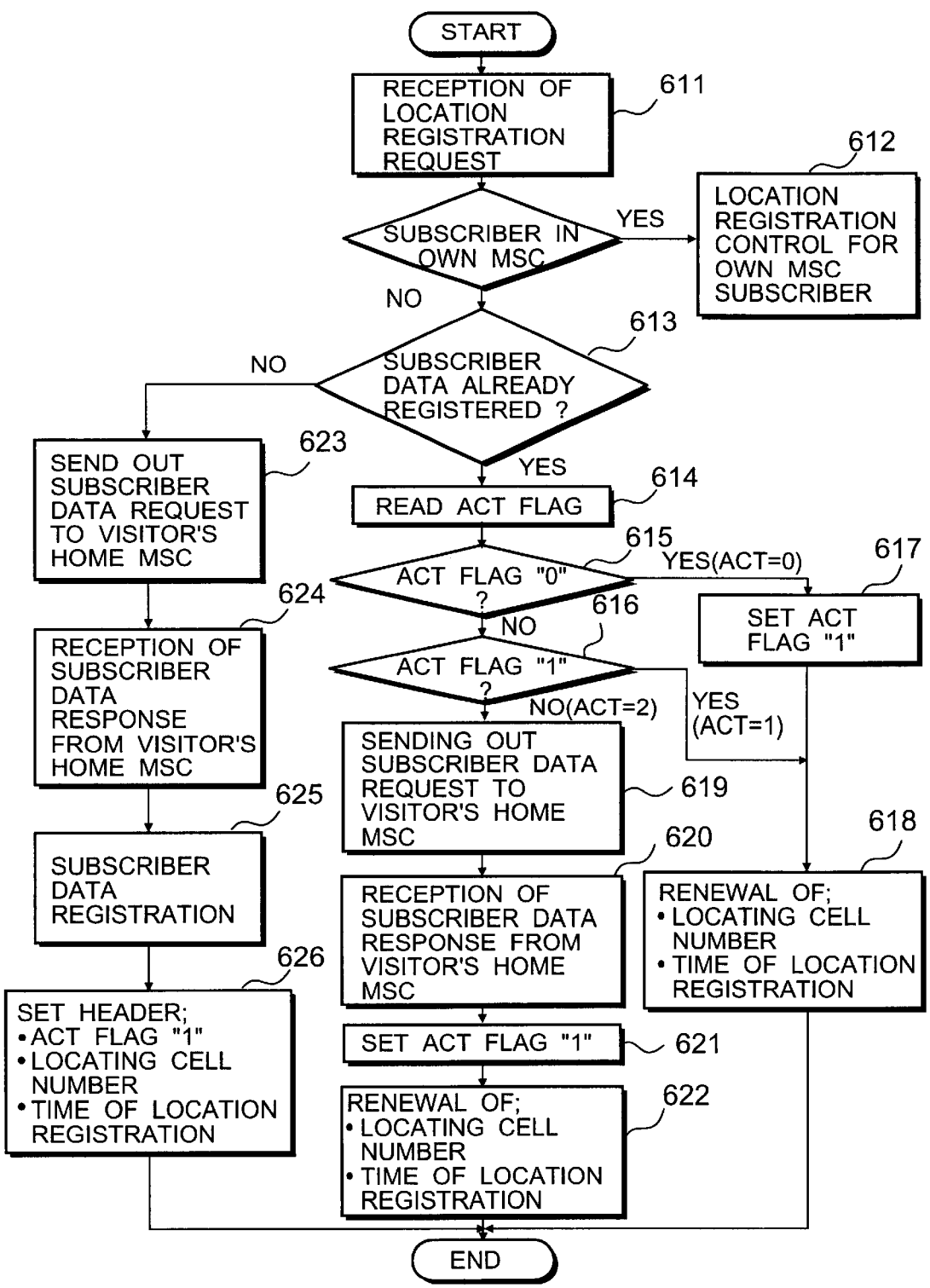
FIG. 6 is a flowchart showing the control operation of the mobile switching center in the case where the location registration signal is received from the mobile station through the subscriber data control method according to the present invention.

FIG. 6 is a flowchart showing the control operation of the mobile switching center in the case where the location registration signal is received from the mobile station.

The mobile switching center, that has received the location registration signal from the mobile station (step 611), discriminates whether the mobile station is a home mobile station, which is registered and managed by the own mobile switching center, or a visitor mobile station, which is registered and managed by other mobile switching center, with reference to the equipment number of the mobile station notified together with the location registration signal.

If the mobile station is the home mobile station, the mobile switching center performs the location registration control (step 612). On the other hand, if the mobile station is the visitor mobile station, the mobile switching center confirms whether the subscriber data of the visitor mobile station has already been registered, or not (step 613).

As a result of this confirmation, in the case where the subscriber data has not yet been registered (step 613: No), the mobile switching center sends out a subscriber data request signal to the home mobile switching center (step 623), and receives the subscriber data and a subscriber data response signal transmitted from the home mobile switching center (step 624).

The mobile switching center registers the received subscriber data in a subscriber data area for a visitor subscriber in association with the subscriber number and the equipment number (step 625), and sets necessary information on the header information of the subscriber data (step 626). In other words, the mobile switching center sets the ACT flag at "1" and registers the mobile station existing cell number where location registration is made, its time and the discrimination information of the home mobile switching center which was included in the subscriber data response signal.

Also, in the case where the mobile station is the visitor mobile station but the subscriber data has been already registered, the mobile switching center reads out the ACT flag of the subscriber data of the mobile station (step 614) and performs the following operation in accordance with the current set value of the ACT flag.

In the case where the current set value of the ACT flag is "0" of "inactive" (step 615: Yes), this is in a state where there has been no succeeding periodic location registration even if a predetermined given period of time or longer had elapsed from a last periodic location registration, that is, in a subscriber data delete waiting state which will be described later.

In this state, since the reception of the location registration request signal means that the mobile station still exists in this service area, the mobile switching center sets the ACT flag at "1" and restores the subscriber data (step 617). Then, the mobile switching center renews the mobile station existing cell number and the registration time to reported ones (step 618).

In the case where the ACT flag is "1" of "active" (step 616: Yes), this is in a state where the mobile station exists in the service and is performing the periodic location registration request. Since the location registration request in this state is a periodic report of the radio paging are in which the mobile station exists, the mobile switching center renews the mobile station existing cell number and the registration time by the reported contents (step 618).

In the case where the ACT flag is "2" of "inactive" (step 616: No), this is in a state where the mobile station has moved to another service area and performed the location registration in the new service area, but it is expected to come back this service area again. The case where the ACT flag is "2" means that the mobile switching center keeps (not delete) the subscriber data of the mobile station, although the mobile switching center has received the subscriber data delete request from the home mobile switching center, taking a case in which the mobile station again returns to this service area into account. Therefore, the reception of the location registration request in this case means that the mobile station again returns to this service area.

In this case, since the mobile switching center is keeping the subscriber data of the mobile station, it is unnecessary to have the subscriber data transferred from the home mobile switching center. However, since it is necessary to perform the location registration of the mobile station in the home mobile switching center, the mobile switching center transmits the subscriber data request signal to the home mobile switching center (step 619).

The subscriber data request signal may be a new subscriber data request signal having an additional information field which means the transfer of the subscriber data is not necessary, or may be a conventional subscriber data request signal.

In the case of introducing the new subscriber data request signal having the additional information field which means the transfer of the subscriber data is not necessary, the home mobile switching center renews the location registration information of the mobile station and sends back the subscriber data response signal without adding the subscriber data. Accordingly, in the home mobile switching center, although the analysis control of the new information field increases, a load relating to the control operation for transferring the subscriber data is reduced. Also, the mobile switching center, that has transmitted the subscriber data request signal, recognizes that the request signal has been normally received by the home mobile switching center by receiving the subscriber data response signal, so that it can continue the subsequent control and reduces the load of the control operation for setting the subscriber data in the visitor subscriber area.

On the other hand, in the case of employing the subscriber data request signal as in the conventional manner, the home mobile switching center renews the reported location registration information and sends back the subscriber data response signal including the subscriber data of the mobile station. Then, the mobile switching center, that has transmitted the subscriber data request signal, recognizes that the request signal has been normally received by the home mobile switching center by receiving the subscriber data response signal, and ignores the subscriber data included in subscriber data response signal and continues the subsequent control. Similarly, in this case, the load of the control operation for setting the subscriber data in the visitor subscriber area is reduced.

In this way, when the mobile switching center has completed the report to the home mobile switching center and received the subscriber data response signal (step 620), it sets the ACT flag of the header information of the subscriber data at "1" and restores the subscriber data (step 621). Then, the mobile switching center renews the mobile station existing cell number and the registration time by the reported contents (step 622).

As described above with reference to FIG. 6, even if the subscriber data has been set as "inactive", it can be restored to "active" by receiving the new location registration request signal from the mobile station if it is before the operation shifting to the delete operation which will be described later.

Subsequently, the operation of deleting the subscriber data which has been judged to be unnecessary will be described with reference to FIG. 7.

As has been described above, in the subscriber data with respect to the mobile station which has not performed the periodic location registration for a time largely exceeding a predetermined period of time, the ACT flag is set at "0" and "inactive". Then, from the viewpoint of using the resource effectively, it is not desirable to wait for the restoration by a succeeding periodic location registration indefinitely because the visitor subscriber data area will become full.

In view of the above, in the case where there is no succeeding location registration request for the subscriber data whose ACT flag remains being set at the "0" of "inactive" state, it is judged that the mobile station does not exist in this service area anymore, and the control of deleting the subscriber data should be performed. Also, it is not desirable to wait an indefinite time for the state change of the ACT flag "2", because keeping such unnecessary subscriber data for a long time causes the resource efficiency of the subscriber data area being deteriorated. In view of this, the subscriber data control method according to the present invention performs the control shown in a flowchart relating to the subscriber data deletion shown in FIG. 7.

Figure 7:
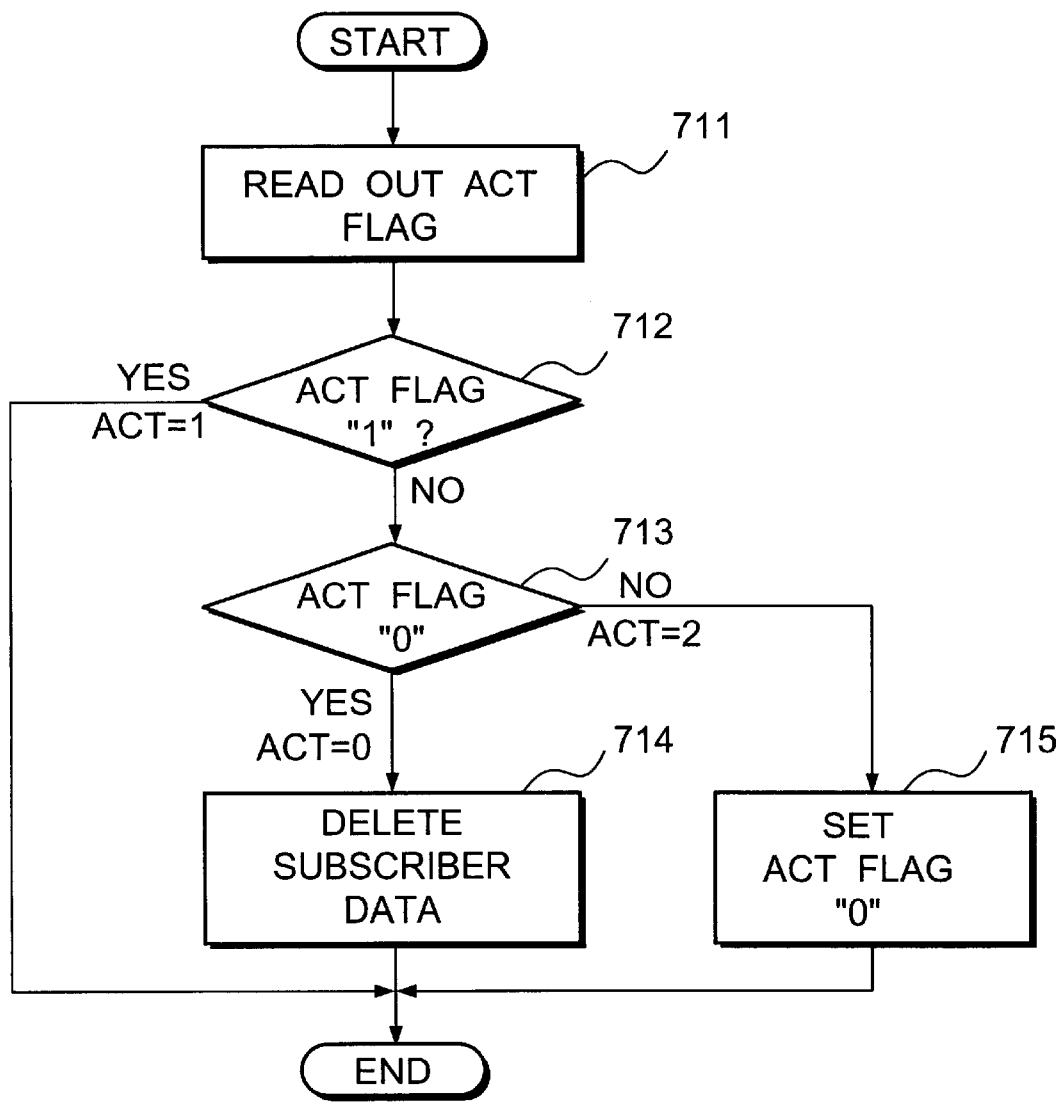
FIG. 7 is a flowchart showing the operation of deleting the subscriber data through the subscriber data control method according to the present invention.

FIG. 7 shows a process performed at predetermined time intervals though it depends on the system, and performed at time intervals (for example, intervals of from 15 to 30 minutes) proper to delete the subscriber data the ACT flag of which is set at the "0" of "inactive" state. In this process, all of the visitor subscriber data are periodically sequentially scanned, and the following control operation is performed for each of the subscriber data.

First, by extracting the ACT flag, the data contents that have been set is recognized (step 711).

In the case where the ACT flag is "1", since the subscriber data is in the "active" state, completes the process without any control (step 712: Yes).

In the case where the ACT flag is "2" of "inactive", the ACT flag is set at the "0" of "inactive" state (step 715), and puts in a "waiting for deletion" state where the subscriber data will be deleted in the next operation period if there is no location registration request till then. This is based on a concept that one more period is to be waited for performing deleting process for the case that the state of the ACT flag changed just before this deleting process since the ACT flag is set at "2" immediately after the mobile station has moved to another service area Accordingly, the time interval until the deletion is fluctuated dependent upon the time point when the ACT flag is set at "2" from a time slightly longer than one period to a time slightly shorter than two period.

The subscriber data, whose ACT flag is being set at "0", is deleted immediately (step 714). This is a concept that since a various guard timings have been provided until the ACT flag is set at "0", taking into consideration the non-report of the periodic location registration due to the deterioration of the radio signal transmission state or the like, the subscriber data set between the operation periods of this process is to be deleted in the operation of the next period.

FIG. 8 is a state transition diagram showing the transition of the subscriber data state through the above-described subscriber data control method according to the present invention. Referring to FIG. 8, the operation of the subscriber data control method according to the present invention will be described in order.

If there is a first location registration (801) from the mobile station which is subjected to subscriber registration in another service area, the subscriber data transferred from the home mobile switching center is registered in the visitor subscriber data area (802). In this state, "1" is set on the ACT flag of the header section which is representing the "active" state (state 803).

The "active" state is continuously renewed every time-the periodic location registration report (812) is obtained. However, in the case where there is no succeeding periodic location registration even if a predetermined period of time has elapsed (periodic location registration timeout: 813), the ACT flag is changed to "0" and changed to the "inactive" state (state 804). Also, in the case where the subscriber data delete request signal is received from the home mobile switching center because the mobile station having moved to another service area (814), the ACT flag is changed to "2" and changed to the "inactive" state (state 806).

In the "inactive" state where the ACT flag is set at "2" (state 806), if the location registration report (821) is again obtained from the mobile station within a predetermined period of time, the ACT flag is set at "1" and restored to the "active" state (state 803). However, in the case where there is no location registration report even if the predetermined period of time has elapsed (state change wait timeout: 816), the ACT flag is changed to "0" and changed to the "inactive" state (state 804).

In the "inactive" state where the ACT flag is set at "0" (state 804), deletion is reserved within the predetermined period of time, and if the location registration report (822) is again obtained from the mobile station within that period of time, the ACT flag is changed to "1" and restored to the "active" state (state 803). However, in the case where there is no location registration report even if the predetermined period of time has elapsed (delete wait timeout: 818), the state is changed to the subscriber data delete state (state 805), and the subscriber data of the subject mobile station is deleted from the visitor subscriber data area.

FIG. 9 is a signal sequence diagram showing a case in which the visitor mobile station in the subject service area has moved to another service area after the subscriber data was registered as a visitor subscriber in the subject service area, and thereafter the mobile station again returned to the subject service area within a period of the subscriber data delete timing.

Since the details of the present invention was already described, the operation relating to this drawing will be described in brief.

When the MS 4, whose home MSC is the MSC 1, performs the location registration in the service area of the MSC 2 (911), the MSC 2 transmits a subscriber data request signal (901) to the MSC 1 which is a home MSC of the MS 4. The MSC 1 that has received the subscriber data request signal transfers the subscriber data of the MS 4 together with the subscriber data response signal (902).

The MSC 2 registers the received subscriber data in the visitor subscriber data area and sets the ACT flag at "1" (912). In this state, the MS 4 can receive a communication service in the service area of the MSC 2.

When the MS 4 moves from the service area of the MSC 2 to the service area of the MSC 3 and performs the location registration (913) there, the MSC 3 transmits a subscriber data request signal (903) to the MSC 1 which is the home MSC of the MS 4. The MSC 1 that has received the subscriber data request signal transfers the subscriber data of the MS 4 together with the subscriber data response signal (904). Then, since the MSC 1 knows that the MS 4 does not already exist in the service area of the MSC 2, the MSC 1 transmits a subscriber data delete request signal (905) to the MSC 2.

Upon receiving the subscriber data delete request signal, the MSC 2 puts the subscriber data of the MS 4 in a holding state without deleting and sets the ACT flag at "2". Then, the MSC 2 sends back the subscriber data delete response signal (906) to the MSC 1.

In addition, although the details were described above, counting of the delete timings with respect to the subscriber data of the MS 4 which is put in the holding state starts (921).

If the MS 4 returns to this service area within the counted period of the subscriber data delete timing and performs the location registration (915), the MSC 2 transmits the subscriber data request signal (907) to the MSC 1, and when the MSC 2 receives the subscriber data response signal (908) from the MSC 1, it restores the subscriber data of the MS 4 which has been put in the holding state and sets the ACT flag at "1" (916).

If there is no location registration of the MS 4 even if the subscriber data delete timing period has elapsed, the subscriber data that has been put in the holding state is deleted.

Also, as the details were described above, the subscriber data request signal which is transmitted to the home MSC while the subscriber data is being put in the holding state may be of a conventional format or a format in which a new field indicating that the transfer of the subscriber data is unnecessary is added.

Subsequently, another embodiment mode of the present invention will be described.

The above-mentioned first embodiment mode was described with the values of the ACT flag which are to be set in the header section of the subscriber data being three kinds of "0", "1" and "2". This embodiment is a control method using two kinds of "0" and "1". The meanings of the respective values are identical with those in the first embodiment modes, that is, "0" is "inactive" that means a delete wait state, and "1" is "active" that means the operating state.

In another embodiment mode, even if the home mobile switching center of the mobile station discriminates that the service area, in which the mobile station currently exists, has changed, it does not send out the subscriber data delete request signal to the mobile switching center of the service area in which the mobile station previously existed.

For example, a difference from the first embodiment mode will be complementarily described again with reference to FIG. 9.

When the MS 4 originally registered in the MSC 1, performs the location registration in the service area of the MSC 2 (911), the MSC 2 transmits the subscriber data request signal (901) to the MSC 1 which is a home MSC of the MS 4. The MSC 1 that has received the subscriber data request signal transfers the subscriber data of the MS 4 together with the subscriber data response signal (902).

The MSC 2 registers the received subscriber data in the visitor subscriber data area and sets the ACT flag at "1" (912). In this state, the MS 4 can receive a communication service in the service area of the MSC 2.

When the MS 4 has moved from the service area of the MSC 2 to the service area of the MSC 3, and performs the location registration (913) there, the MSC 3 transmits the subscriber data request signal (903) to the MSC 1 which is the home MSC of the MS 4. The MSC 1 that has received the subscriber data request signal transfers the subscriber data of the MS 4 together with the subscriber data response signal (904).

The above control operation is identical with that in the first embodiment mode.

In this situation the MSC 1 (the home MSC of the MS 4) knows that the MS 4 is not located in the service are of the MSC 2, but the MSC 1 does not transmit to the MSC 2 the subscriber data delete request signal (905). The reason is based on the following concept. In the first embodiment mode, as described with reference to FIG. 5(A), unless the mobile station performs the periodic location registration for specifying the paging are in the service area in which the mobile station exists for a predetermined period of time, the state is set at the ACT flag "0" which is inactive and waiting for deletion state, and then, the subscriber data: is deleted if no location registration is performed within a predetermined period of time. Accordingly, it is unnecessary to transmit the subscriber data delete request signal from the home mobile switching center to delete the subscriber data.

Accordingly, the MSC 2 sets the ACT flag of the subscriber data of the MS 4 at "0" because of the reason that there is no location registration request from the MS 4 for the predetermined period of time and starts the counting of the subscriber data delete timing.

When the MS 4 returns to the subject service area within the counted period of the subscriber data delete timing and performs the location registration, the MSC 2 transmits the subscriber data request signal to the MSC 1 as in the first embodiment mode, and when the MSC 2 receives the subscriber data response signal from the MSC 1, it restores the subscriber data of the MS 4 which has been put in the delete wait state and sets the ACT flag at "1".

If there is no location registration of the MS 4 even if the subscriber data delete timing period has elapsed, the subscriber data is deleted.

Also, as the details were described above, the subscriber data request signal which is to be transmitted to the home MSC, while the subscriber data is being put in the holding state, may be of a conventional format or a format in which a new field indicating that the transfer of the subscriber data is unnecessary is added.

As described above, the subscriber data control method according to the present invention enables the control load on the mobile switching center relating to the visitor subscriber data processing with respect to the mobile station that frequently moves between the service areas to be reduced and also the resource of the visitor subscriber data area to be effectively used. In particular, in the other embodiment, the processing load in the home mobile switching center is reduced, and also the signal transmitted and received in the mobile switching network can be deleted, thereby contributing to the resource effective use in the entire network As was described above, in the subscriber data control method in the mobile communication network according to the present invention, the subscriber data of the visitor mobile station is not deleted in response to the subscriber data delete request from its home mobile switching center due to a fact that the visitor mobile station has further moved to another service area, and the state of the registered subscriber data of the visitor mobile station is set as the inactive holding state from the active state, and thereafter in the case where the visitor mobile station returns to the subject service area within a predetermined period of time and again performs the location registration, restoration of the subscriber data of the visitor mobile station can be made by only changing the state of the subscriber data from the inactive state to the active state.

For that reason, since it is unnecessary to request the subscriber data to the home mobile switching center, and also the subscriber data can be ignored even if it is transmitted, there can be obtained such an advantage that the control load on the mobile switching center is reduced. This is in particular remarkable in the case where in a large city where a plurality of service areas are constructed concentrically, the mobile station frequently moves across the service areas.

Also, with respect to the visitor mobile station from which the periodic location registration report for renewing and registering the paging area periodically is not obtained because the user of the mobile station turns off its power supply and moves to another service area as it is, or moves to another service area by a subway which radio signals do not reach, or with respect to the visitor mobile station whose subscriber data is being put in the holding state and does not perform location registration within a predetermined period of time, since the subscriber data which is in the delete wait state is periodically searched and deleted in a predetermined period of time, there is obtained such an advantage that the resource of the visitor subscriber data area can be effectively used.

In addition, in the embodiment mode in which subscriber data delete signal may not be transmitted to each mobile switching center of the service area in which the visitor mobile station previously existed, although the change of the service area for the mobile station is detected at the home mobile switching center, the load on the home mobile switching center is reduced and it also contributes to the effective use of the resource in the entire network.

Although the embodiment modes of the present invention were described in detail with reference to the drawings, the present invention is not limited to those embodiment modes, and the modification of design falling within the subject matter of the present invention, etc., are contained in the invention as set forth in the claims.

What is claimed is:

1. A subscriber data control method in a mobile communication network in which subscriber data of a mobile station is transferred from a home mobile switching center to a destination mobile switching center when the mobile station moves from a home service area controlled by the home mobile switching center to a destination services area controlled by the destination mobile switching center, and performs a location registration in the destination service area, said method comprising:

registering said subscriber data, in said destination mobile switching center, transmitted from said home mobile switching center in response to a location registration request by said destination mobile switching center in accordance with the location registration performed by the mobile station;

changing a state of said registered subscribed data from an active state representative of an operating state to an inactive state representative of a holding state in response to a subscriber data delete request, which is caused by a recognition of movement of the mobile station to another service area, by said home mobile switching center;

searching said registered subscriber data periodically in a first period of time, and changing the state of said registered subscriber data of the mobile station, which does not perform a periodic location registration for specifying a paging area in said destination service area with a predetermined period of time, to the inactive state; and searching said registered subscriber data periodically in a second period of time, and deleting said registered subscriber data of the inactive state.

2. A subscriber data control method in a mobile communication network in which subscriber data of a mobile station is transferred from a home mobile switching center to a destination mobile switching center when the mobile station moves from a home service area controlled by the home mobile switching center to a destination service area controlled by the destination mobile switching center, and performs a location registration in the destination service area, said method comprising:

registering said subscriber data, in said destination mobile switching center, transmitted from said home mobile switching center in response to a location registration request by said destination mobile switching center in accordance with the location registration performed by the mobile station;

searching said registered subscriber data periodically in a first period of time, and changing the state of said registered subscriber data of the mobile station, which does not perform a periodic location registration for specifying a paging area in said destination service area within a predetermined period of time, from an active state representative of an operating state to a first inactive state representative of a delete waiting state;

changing a state of said registered subscriber data from an active state representative of an operating state to a second inactive state representative of a holding state in response to a subscriber data delete request, which is caused by a recognition of movement of the mobile station to another service area, by said home mobile switching center; and searching said registered subscriber data periodically in a second period of time, deleting said registered subscriber data of said first inactive state, and changing the state of said registered subscriber data of said second inactive state to said first inactive state.

3. A subscriber data control method in a mobile communication network in which subscriber data of a mobile station is transferred from a home mobile switching center to a destination mobile switching center when the mobile station moves from a home service area controlled by the home mobile switching center to a destination service area controlled by the destination mobile switching center, and performs a location registration in the destination service area, said method comprising:

registering said subscriber data, in said destination mobile switching center, transmitted from said home mobile switching center in response to a location registration request by said destination mobile switching center in accordance with the location registration performed by the mobile station;

searching said registered subscriber data periodically in a first period of time, and changing the state of said registered subscriber data of the mobile station, which does not perform a periodic location registration for specifying a paging area in said destination service area within a predetermined period of time, from an active state representative of an operating state to a first inactive state representative of a delete waiting state;

changing a state of said registered subscriber data from an active state representative of an operating state to a second inactive state representative of a holding state in response to a subscriber data delete request by said home mobile switching center;

changing the state of said registered subscriber data to the active state when receiving the location registration from said mobile station within a predetermined period of time after the state of said registered subscriber data was changed to any inactive state of the first inactive state and the second inactive state; and searching said registered subscriber data periodically in a second period of time, deleting said registered subscriber data of said first inactive state, and changing the state of said registered subscriber data of said second inactive state to said first inactive state.

4. A subscriber data control method in a mobile communication network in which subscriber data of a mobile station is transferred from a home mobile switching center to a destination mobile switching center when the mobile station moves from a home service area controlled by the home mobile switching center to a destination service area controlled by the destination mobile switching center, and performs a location registration in the destination service area, said method comprising:

registering said subscriber data, in said destination mobile switching center, transmitted from said home mobile switching center in response to a location registration request by said destination mobile switching center in accordance with the location registration performed by the mobile station;

changing a state of said registered subscriber data from an active state representative of an operating state to an inactive state representative of a holding state in response to a subscriber data delete request by said home mobile switching center; and ignoring said subscriber data transmitted from said home mobile switching center in response to a location registration request by said destination mobile switching center in accordance with the location registration performed by the mobile station within a predetermined period of time after the state of said registered subscriber data was put in the inactive state, and changing the state of said registered subscriber data from the inactive state to the active state.

5. A subscriber data control method in a mobile communication network in which subscriber data of a mobile station is transferred from a home mobile switching center to a destination mobile switching center when the mobile station moves from a home service area controlled by the home mobile switching center to a destination service area controlled by the destination mobile switching center, and performs a location registration in the destination service area, said method comprising:

registering said subscriber data, in said destination mobile switching center, transmitted from said home mobile switching center in response to a location registration request by said destination mobile switching center in accordance with the location registration performed by the mobile station;

changing a state of said registered subscriber data from an active state representative of an operating state to an inactive state representative of a holding state in response to a subscriber data delete request by said home mobile switching center;

transmitting said location registration request with data indicating that the transfer of the subscriber data is unnecessary to the home mobile switching center when receiving a location registration from said mobile station within a predetermined period of time after the state of said registered subscriber data was put to the inactive state; and receiving a location registration response from the home mobile switching center, and changing the state of said registered subscriber data from the inactive state to the active state.

6. A subscriber data control method in a mobile communication network in which subscriber data of a mobile station is transferred from a home mobile switching center to a destination mobile switching center when the mobile station moves from a home service area controlled by the home mobile switching center to a destination service area controlled by the destination mobile switching center, and performs a location registration in the destination service area, said method comprising:

registering said subscriber data, in said destination mobile switching center, transmitted from said home mobile switching center in response to a location registration request by said destination mobile switching center in accordance with the location registration performed by the mobile station;

searching said registered subscriber data periodically in a first period of time, and changing the state of said registered subscriber data of the mobile station, which does not perform a periodic location registration for specifying a paging area in said destination service area within a predetermined period of time, from an active state representative of an operating state to an inactive state representative of a delete waiting state; and searching said registered subscriber data periodically in a second period of time, and deleting said registered subscriber data of said inactive state.

7. The subscriber data control method in a mobile communication network as claimed in claim 6, said method further comprising:

changing the state of said registered subscriber data to the active state when receiving a location registration from said mobile station within a predetermined period of time after the state of said registered subscriber data having been changed from the active state to the inactive state.

8. The subscriber data control method in a mobile communication network as claimed in claim 6, said method further comprising:

transmitting said location registration request with data indicating that the transmission of the subscriber data is unnecessary to said home mobile switching center when receiving a location registration from said mobile station within a predetermined period of time after the state of said registered subscriber data having been changed to the inactive state; and receiving a location registration response from said home mobile switching center, and changing the state of said registered subscriber data from the inactive state to the active state.

9. A subscriber data control method in a mobile communication network in which subscriber data of a mobile station is transferred from a home mobile switching center to a destination mobile switching center when the mobile station moves from a home service area controlled by the home mobile switching center to a destination service area controlled by the destination mobile switching center, and performs a location registration in the destination service area, comprising the steps of:

registering said subscriber data, in said destination mobile switching center, transmitted from said home mobile switching center in response to a location registration request by said destination mobile switching center in accordance with the location registration performed by the mobile station;

changing the state of said registered subscriber data from an active state representative of an operating state to an inactive state representative of a holding state when the mobile station moves from the destination service area to another service area;

searching said registered subscriber data periodically in a first period of time, and changing the state of said registered subscriber data of the mobile station, which does not perform a periodic location registration for specifying a paging area in said destination services are within a predetermined period of time, to the inactive state; and searching said registered subscriber data periodically in a second period of time, and deleting said registered subscriber data of the inactive state.

10. A subscriber data control method in a mobile communication network, comprising:

receiving, in a home center, a subscriber data request from a first center, when a mobile station moves from a second service area by a second center to a first service area by the first center and preforms a location registration to the first center, wherein a subscriber data of the mobile station has been registered in the second center;

not transmitting, from the home center, a subscriber data delete request signal to the second center in response to the subscriber data request from the first center, whereby the subscriber data registered in the second center is not deleted;

transferring the subscriber data of the mobile station from the home center to the first center in response to the subscriber data request when the subscriber data is not registered in the first center; and deleting the subscriber data registered in the second center if a location registration request from the mobile station to the second center is not made within a predetermined period of time after the subscriber data of the mobile station has been transferred to the first center.

11. A subscriber data control method in a mobile communication network, comprising:

receiving, in a home center, a subscriber data request from a first center, when a mobile station moves from a second service area by a second center to a first service area by the first center and preforms a location registration to the first center, wherein a subscriber data of the mobile station has been registered in the second center;

not transmitting, from the home center, a subscriber data delete request signal to the second center in response to the subscriber data request from the first center, whereby the subscriber data registered in the second center is not deleted;

transferring the subscriber data of the mobile station from the home center to the first center in response to the subscriber data request when the subscriber data is not registered in the first center; and changing the state of the subscriber data registered in the second center from an active state representative of an operating state to an inactive state representative of a holding state when the mobile station moves from the second service area to the first service area.

12. A subscriber data control method as claimed in claim 11, further comprising:

changing the state of the subscriber data registered in the second center from the inactive state to the active state when the mobile station returns to the second service area, whereby the home center does not transmit the subscriber data to the second center when the mobile station returns to the second service area.

13. A subscriber data control method as claimed in claim 11, further comprising:

deleting the subscriber data, registered in the second center, the state of which is the inactive state if a location registration request from the mobile station to the second center is not made within a predetermined period of time.

* * * * *